(12) United States Patent
Takahashi

(10) Patent No.: US 11,458,642 B2
(45) Date of Patent: Oct. 4, 2022

(54) ROBOT ARM COUPLING DEVICE

(71) Applicant: PASCAL ENGINEERING CORPORATION, Itami (JP)

(72) Inventor: Takuya Takahashi, Itami (JP)

(73) Assignee: PASCAL ENGINEERING CORPORATION, Hyogo (JP)

( * ) Notice: Subject to any disclaimer, the term of this patent is extended or adjusted under 35 U.S.C. 154(b) by 413 days.

(21) Appl. No.: 16/612,910

(22) PCT Filed: May 31, 2018

(86) PCT No.: PCT/JP2018/020921
§ 371 (c)(1),
(2) Date: Nov. 12, 2019

(87) PCT Pub. No.: WO2019/012842
PCT Pub. Date: Jan. 17, 2019

(65) Prior Publication Data
US 2020/0164525 A1    May 28, 2020

(30) Foreign Application Priority Data
Jul. 10, 2017   (JP) .............................. JP2017-134499

(51) Int. Cl.
*B25J 15/04* (2006.01)
*B25J 19/00* (2006.01)
*F16B 7/04* (2006.01)

(52) U.S. Cl.
CPC ....... *B25J 19/0033* (2013.01); *B25J 15/0416* (2013.01); *F16B 7/0426* (2013.01)

(58) Field of Classification Search
CPC .. B25J 15/0416; B25J 19/033; B23B 31/1071
See application file for complete search history.

(56) References Cited

U.S. PATENT DOCUMENTS

| | | | | |
|---|---|---|---|---|
| 5,909,882 A | * | 6/1999 | Schill | B23H 7/26 279/157 |
| 6,160,236 A | * | 12/2000 | Nordquist | B23Q 1/0063 219/69.15 |
| 7,278,204 B2 | | 10/2007 | Isogai et al. | |

FOREIGN PATENT DOCUMENTS

| | | | |
|---|---|---|---|
| DE | 20 2015 101 616 | * | 8/2016 |
| JP | H6-190760 A | | 7/1994 |
| JP | H7-223187 A | | 8/1995 |
| JP | 2002-200585 A | | 7/2002 |
| JP | 2009-023050 A | | 2/2009 |
| JP | 2015-213964 A | | 12/2015 |
| WO | 2004/113031 A1 | | 12/2004 |

* cited by examiner

*Primary Examiner* — William C Joyce
(74) *Attorney, Agent, or Firm* — Norris McLaughlin, P.A.

(57) ABSTRACT

A locking mechanism (6) of the robot arm coupling device (1) includes: a concave engagement portion (3a) on the master plate (3); convex engagement portion (4a) on the tool plate (4) for inserting into the concave engagement portion (3a); a plurality of steel balls (16) installed at an external circumferential wall portion (15) of the concave engagement portion (3a), and are capable of being changed over between locking positions and unlocking positions; and an annular fluid pressure cylinder (20) capable of changing over the positions of the plurality of steel balls (16); and a space is defined more radially inward than the plurality of steel balls (16) and the fluid pressure cylinder (20).

10 Claims, 6 Drawing Sheets

ROBOT ARM COUPLING DEVICE

TECHNICAL FIELD

The present invention relates to a robot arm coupling device.

BACKGROUND ART

It is widely practiced to attach various tools to the end of a robot arm via a robot arm coupling device in order to perform various tasks. Such tools include welding torches, painting guns, adhesive guns for applying adhesive, chuck devices for removing molded products from molding machines, chuck devices for gripping various components, and so on.

Such a robot arm coupling device typically includes a master plate that is provided at the end portion of the robot arm, a tool plate that can be attached to the master plate and via which a tool is attached, and a locking mechanism that detachably connects the tool plate to the master plate. Known types of locking mechanism include a ball type locking mechanism that incorporates a plurality of steel balls, a roller type locking mechanism that incorporates a plurality of rollers, a cam type locking mechanism that incorporates a rotatable cam or a rotatable claw or the like.

The locking mechanism can be changed over between a locking position and an unlocking position by the plurality of engagement members (steel balls or rollers) being shifted in the radial direction by a conventional fluid pressure cylinder. Due to the fact that, rather than employing an annular fluid pressure cylinder, a fluid pressure cylinder of a normal construction is employed as this fluid pressure cylinder is disposed at the center portions of the master plate and the tool plate. For this reason, a construction is generally employed in which changeover from the unlocking position to the locking position is performed by shifting the plurality of engagement members in the outward radial direction.

With the robot arm coupling device of Patent Document #1, a conduit member for supplying pressurized air from the side of the master plate to the side of the tool plate is provided so as to project radially outward from the master plate and the tool plate.

With the robot arm coupling device of Patent Document #2, a second unit (i.e. a tool plate) is connected to the lower surface of the first unit (i.e. a master plate), and electrical cables and power supply cables are attached so as to protrude radially outward from a plurality of locations on the outer circumferential surface of the second unit.

With the robot arm coupling device of Patent Document #3, a ball type locking mechanism is employed, and a structure is adopted in which the steel balls are received in ball housing grooves, in order to reduce the surface pressure at locations that are contacted to the steel balls.

PRIOR ART DOCUMENT

Patent Document

Patent Document #1: Japanese Laid-Open Patent Publication 2009-23050.
Patent Document #2: Japanese Laid-Open Patent Publication 2015-213964.
Patent Document #3: International Publication WO2004/113031.

SUMMARY OF INVENTION

Technical Problem

Due to the fact that the fluid pressure cylinder is disposed at the center portions of the master plate and the tool plate, it becomes difficult to ensure sufficient space for arranging the fluid pressure supply conduit and electrical cables at the center portions of the master plate and the tool plate, and it is often the case that such fluid pressure supply/venting conduits and electrical cables are placed in spaces near the external peripheries, or outside the external peripheries, of the master plate and the tool plate.

With the robot arm coupling devices of Patent Documents #1 and #2, since the conduits and the electrical cables protrude radially outward of the master plate and the tool plate, accordingly it becomes difficult to determine the external dimensions of the robot arm coupling device accurately, and there are problems during teaching such as obstruction by the conduits or electrical cables, and the conduits or electrical cables easily suffering damage.

With the robot arm coupling device of Patent Document #3, since a structure is adopted in which the steel balls are received in housing grooves in order to reduce the surface pressure at the locations of the ball type locking mechanism that contact the steel balls, accordingly there is the problem that processing for forming the ball housing grooves entails a certain cost.

An object of the present invention is to provide a robot arm coupling device, with which a fluid pressure supply conduit and/or an electrical cable can be disposed at the central portions of the master plate and the tool plate, so as not to project outside the external peripheries of the master plate and the tool plate.

Means to Solve the Problem

The present invention presents a robot arm coupling device including a master plate provided at the end portion of a robot arm, a tool plate that can be connected to the master plate and to which a tool is attached, and a locking mechanism that detachably connects the tool plate to the master plate, wherein: the locking mechanism includes: a concave engagement portion that is formed on a lower side portion of the master plate so as to open downward; a convex engagement portion that is formed on an upper side portion of the tool plate and is capable of being inserted into the concave engagement portion; a plurality of engagement members that are installed at an external circumferential wall portion of the concave engagement portion, and are capable of being changed over between locking positions in which they engage with an engagement portion formed on the convex engagement portion, and unlocking positions in which they do not engage the engagement portion; and a fluid pressure cylinder that is formed in the master plate, and is capable of changing over the plurality of engagement members from their unlocking positions to their locking positions; and wherein at least one fluid pressure passage that supplies and/or discharge fluid to and/or from the fluid pressure cylinder is provided in the master plate, more radially inward than the plurality of engagement members and the fluid pressure cylinder.

Accordingly, at least one fluid pressure passage for supplying and/or discharging fluid to and/or from the fluid pressure cylinder can be provided more radially inward than the plurality of engagement members and the fluid pressure cylinder, and so as not to project outward from the outer periphery of the master plate.

In a preferable first aspect, the fluid pressure cylinder is an annular fluid pressure cylinder that changes over from the unlocking position to the locking position by shifting the plurality of engagement members in the inward radial direction.

Accordingly, since the fluid pressure cylinder is an annular fluid pressure cylinder, therefore it is possible to perform changeover from the unlocking position to the locking position by shifting the plurality of engagement members in the inward radial direction. Moreover, it is possible to ensure sufficient space in the central spare of the annular fluid pressure cylinder for arranging the fluid pressure passage or a conducting wire.

In a preferable second aspect, one or a plurality of fluid pressure supply/discharge conduits for supplying fluid from a robot arm side to a tool side are disposed more radially inward than the plurality of engagement members and the fluid pressure cylinder.

Accordingly, it is possible to dispose the one or a plurality of fluid pressure supply/discharge conduits more radially inward than the plurality of engagement members and the fluid pressure cylinder, and accordingly it is possible to arrange the conduit so that it does not project outward from the outer peripheries of the master plate or the tool plate.

In a preferable third aspect, one or a plurality of conducting wires for transferring electrical power or electrical signals between the robot arm side and the tool side are disposed more radially inward than the plurality of engagement members and the fluid pressure cylinder.

Accordingly, it is possible to dispose the one or a plurality of conducting wires more radially inward than the plurality of engagement members and the fluid pressure cylinder, and thus it is possible to arrange the conducting wire so that it does not project outward from the outer peripheries of the master plate or the tool plate.

In a preferable fourth aspect, the engagement members are steel balls; an annular gap, capable of receiving the plurality of steel balls closely in a circumferential direction, is defined in the external circumferential wall portion of the concave engagement portion by a pair of annular taper surfaces that oppose one another; and the annular gap is defined by an external circumferential wall portion main body and an end side split member that is split from an end side portion of the external circumferential wall portion.

Accordingly, since the plurality of steel balls are arranged in an annulus, and the plurality of steel balls are arranged closely in the circumferential direction, accordingly the number of steel balls becomes great, and, due to the fact that the surface pressure at the contact surfaces that contact with the steel balls becomes lower, it is possible to receive the plurality of steel balls closely in the circumferential direction in the annular gap defined by the pair of annular taper surfaces that oppose one another. Moreover it is possible to reduce the cost of production because it is not necessary to form any housing groove, since the surface pressure at the surfaces that contact with the steel balls becomes lower.

In a preferable fifth aspect, the fluid pressure cylinder is formed at a location near an outer periphery of the master plate, and the plurality of steel balls are disposed at a location near the outer periphery of the master plate.

Accordingly, since the fluid pressure cylinder is an annular pressure cylinder and is formed at a location near the outer periphery of the master plate, therefore, by increasing the pressure reception area of the fluid pressure cylinder, it is possible to increase the drive force of the fluid pressure cylinder. Moreover, since the plurality of steel balls are disposed at a location near the outer periphery of the master plate, and thus it is possible to make the number of steel balls large, and it is possible to reduce the surface pressure at the locations that receive the steel balls.

In a preferable sixth aspect, the fluid pressure supply/discharge conduit includes a first passage formed within the master plate, a second passage formed within the tool plate, and a coupling mechanism that is capable of connecting together the first and second passages.

Accordingly, when the robot arm coupling device is connected, the first and second passages can be connected together via the coupling mechanism.

In a preferable seventh aspect, the conducting wire includes a connector that is electrically connected together when the tool plate is connected to the master plate by the locking mechanism.

Accordingly to the structure described above, when the robot arm coupling device is connected, the conducting wire can be connected together via the connector.

Advantages of Invention

According to the present invention, various advantages as described above may be obtained.

DESCRIPTION OF EMBODIMENTS

Figure 1:
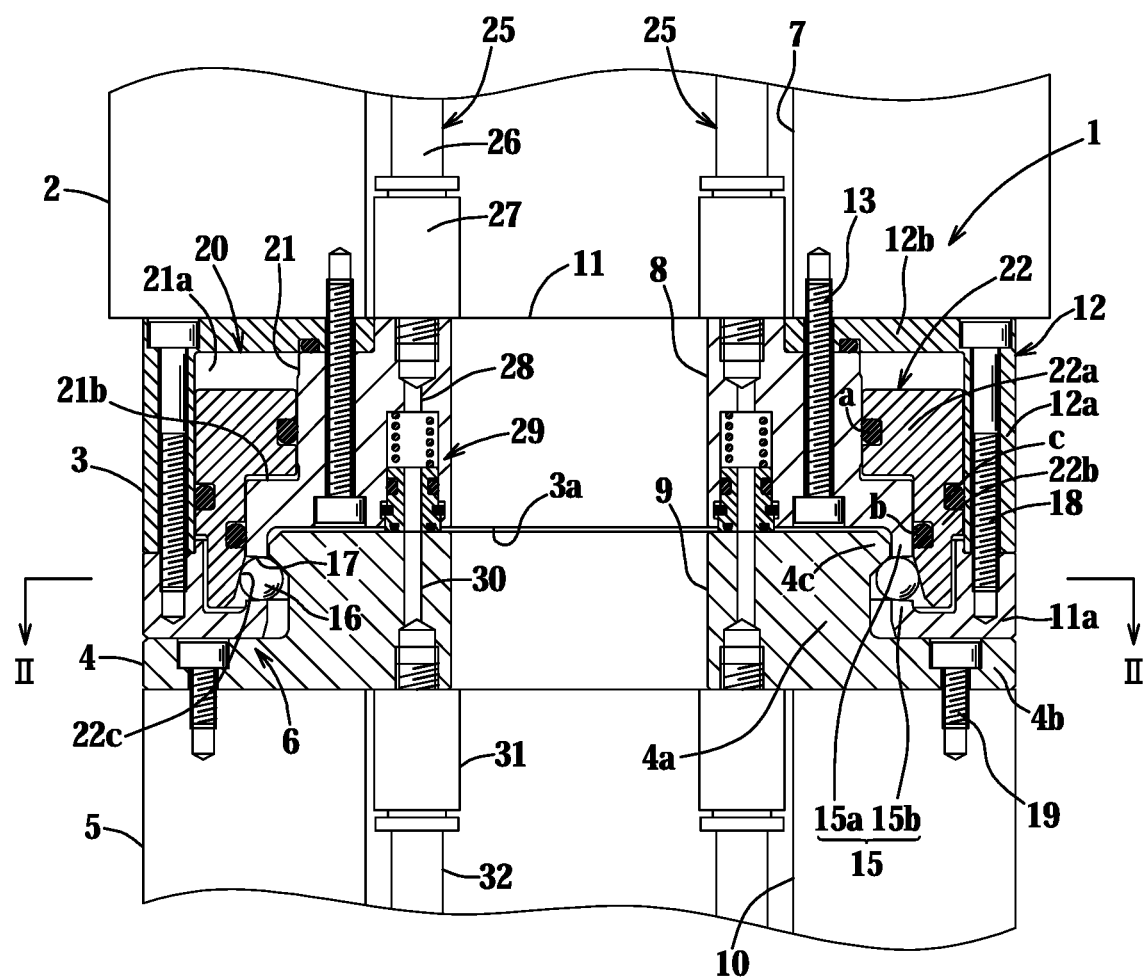
FIG. 1 is a vertically sectional view of a robot arm coupling device according to an embodiment of the present invention.
Figure 2:
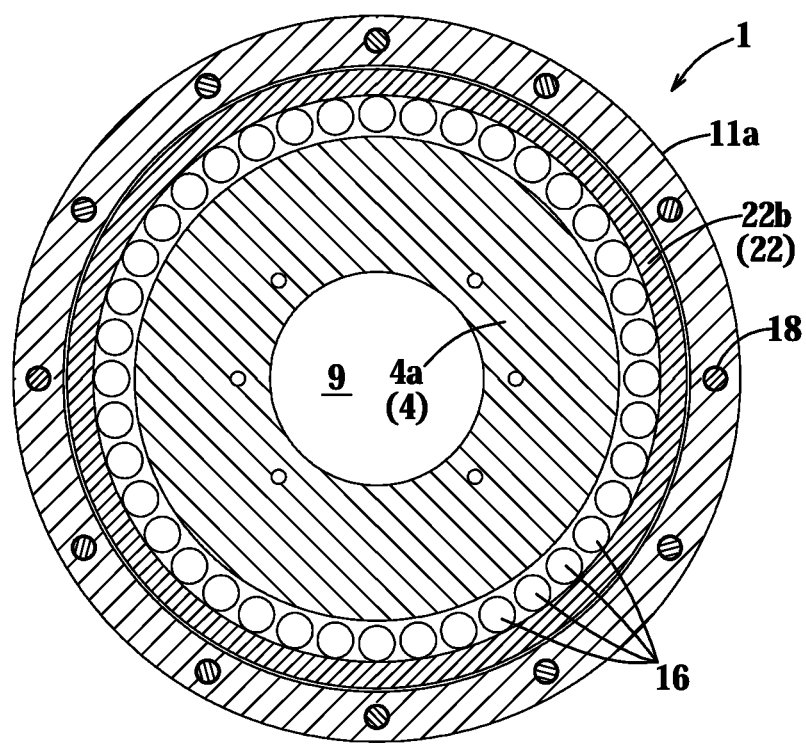
FIG. 2 is a horizontal sectional view of the robot arm coupling device.

Embodiments of the present invention will now be explained with reference to the drawings.

As shown in FIG. 1 through FIG. 5, the robot arm coupling device 1 comprises a master plate 3 that is provided on the leading end portion of a robot arm 2, a tool plate 4 that can be connected to the master plate 3 and to which a tool is attached, and a locking mechanism 6 that detachably connects the tool plate 4 to the master plate 3.

The master plate 3 comprises an annular member 11 having a predetermined thickness and formed with a cylindrical through hole 8 in its central portion, and a ring member 12 that surrounds the external periphery of the annular member 11.

The ring member 12 includes a ring wall 12a having an outer circumferential surface, and an annular plate 12b formed integrally with the ring wall 12a. The annular plate 12b is provided at the upper end portion of the external circumferential portion of the master plate 3, and the outer circumferential edge portion of the annular plate 12b and the upper end portion of the ring wall 12a are formed integrally with one another.

The annular member 11 and the ring member 12 are fixed to the tip end surface (i.e. the lower end surface) of the robot arm 12 by, for example, six bolts 13 that are inserted through them at locations on the radially outward side portion of the annular member 11 and a radially inward side portion of the annular plate 12b.

A concave circular engagement portion 3a with its lower end open is formed on the lower end portion of the annular member 11, with regard to the external circumferential wall portion 15 of the concave engagement portion 3a, a lower portion than the external circumferential wall portion main body 15a is formed as an end side split member 11a, and this end side split member 11a has an external circumferential wall portion lower end portion 15b, a horizontal wall portion, and a radially external vertical wall portion. This external circumferential wall portion 15 is positioned at a location near the outer periphery of the master plate 3. An annular gap 17 that receives and holds a plurality of steel balls 16 is defined between the external circumferential wall portion main body 15a and the external circumferential wall portion lower end portion 15b, and the end side split member 11a is fixed to the ring wall 12a by, for example, six bolts 18 that are inserted from above through the ring wall 12a.

The tool plate 4 is formed from a circular plate member having a predetermined thickness, with a cylindrical through hole 9 being formed at its central portion, with a convex engagement portion 4a that is capable of being inserted into the concave engagement portion 3a from above being formed at the upper end portion of the tool plate 4, and with a flange portion 4b that is capable of contacting against the lower surface of the end side split member 11a being formed at the radially external portion of the tool plate 4, this flange portion 4b being fixed by, for example, six bolts 19 to the upper surface of a tool holding member 5 that is fixed to the lower surface of the tool plate 4. An annular engagement portion 4c that projects radially outward is formed on the upper end portion of the convex engagement portion 4a.

The locking mechanism 6 comprises the concave engagement portion 3a, the convex engagement portion 4a, the plurality of steel balls 16 that are installed in the external circumferential wall portion 15 of the concave engagement portion 3a and that can be changed over between locking positions in which they engage to the annular engagement portion 4c and unlocking positions in which they do not engage thereto (these balls correspond to engagement members), and a fluid pressure cylinder 20 that is formed in the master plate 3 and is capable of changing over the plurality of steel balls 16 between their unlocking positions and their locking positions.

The fluid pressure cylinder 20 is built as an annular fluid pressure cylinder, and can change over the plurality of steel balls 16 from their unlocking positions to their locking positions by shifting them in the radially inward direction.

The fluid pressure cylinder 20 is formed at a location near the outer periphery of the master plate 3. The fluid pressure cylinder 20 comprises an annular cylinder bore 21, an annular piston member 22, a fluid chamber for locking 21a, a fluid chamber for unlocking 21b, and two fluid pressure conduits 23, 24 which will be described hereinafter.

Due to the annular member 11 of the master plate 3 and the ring member 12, the cylinder bore 21 is formed to have a letter L shaped cross section. The piston member 22 includes an annular piston portion 22a and an annular rod portion 22b that extends downward from the lower end of the radially external portion of the piston portion 22a. Two seal members a, b are fitted to the internal peripheral portion of the piston member 22, and one seal member c is fitted to the outer peripheral portion of the piston member 22.

An annular curved surface 22c whose diameter increases downward is formed on the inner peripheral surface of the lower end portion of the rod portion 22b, and, when the piston member 22 is driven downward, the annular curved surface 22c pushes the plurality of steel balls 16 from their radially outward unlocking positions to their radially inward locking positions.

The plurality of steel balls 16 can be received in the annular gap 17 defined by the external circumferential wall portion 15 of the concave engagement portion 3a, and are arranged closely in the circumferential direction. The annular gap 17 is defined by an annular taper surface 17a on the lower end of the external circumferential wall portion main body 15a and an annular taper surface 17b on the upper end of the external circumferential wall portion lower end portion 15b, which oppose one another in the vertical direction. The taper surface 17a is sloped so as to become lower radially inward, and the taper surface 17b is sloped so as to become higher radially inward, so that, with this configuration, the steel balls 16 do not fall out from the annular gap 17 in the radially inward direction.

Figure 3:
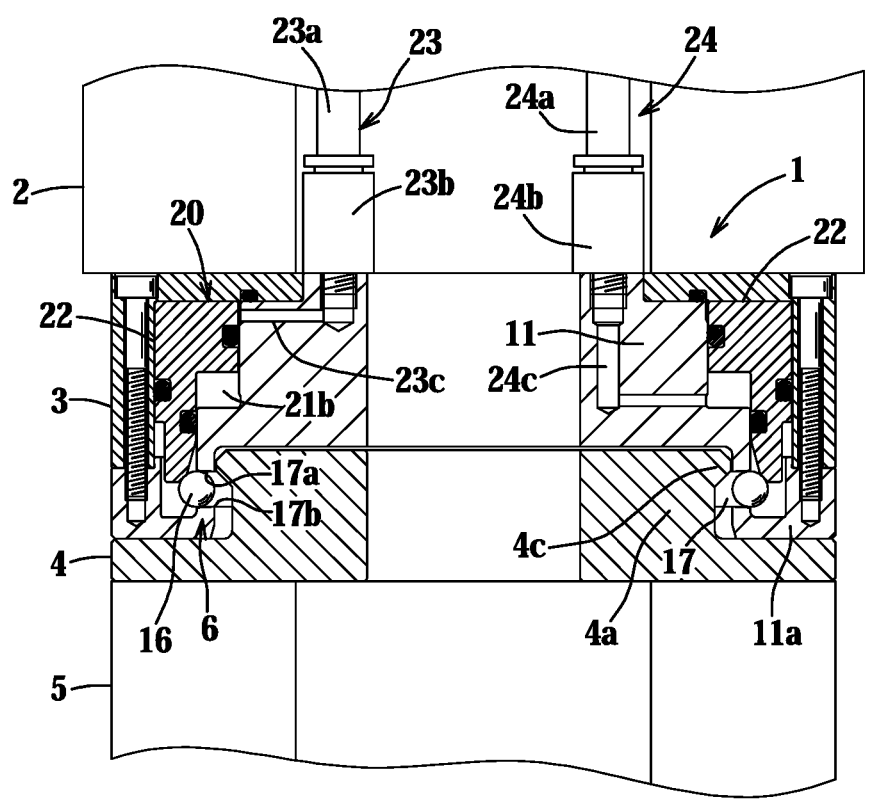
FIG. 3 is a vertically sectional view of the robot arm coupling device (in its unlocked state)
Figure 4:
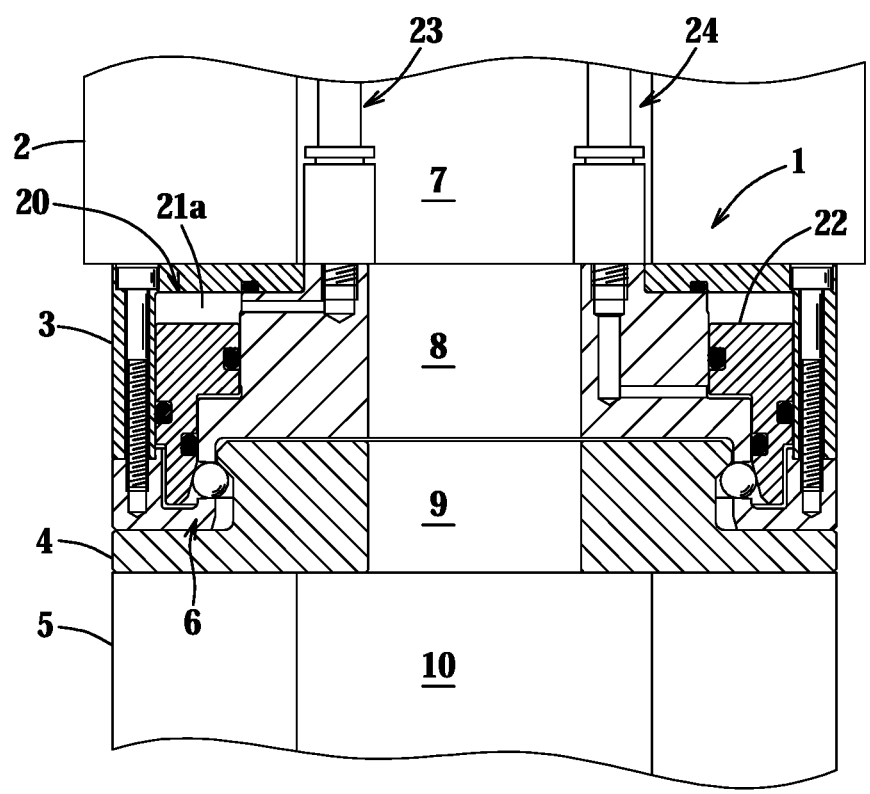
FIG. 4 is a vertically sectional view of the robot arm coupling device (in its locked state)

As shown in FIG. 3, during the unlocked state when fluid is charged into the fluid chamber for unlocking 21b and the piston member 22 is driven upward, the piston member 22 of the fluid pressure cylinder 20 is in its upper limit position, and the plurality of steel balls 16 are positioned at their maximum limit positions radially outward, where they do not project radially inwardly from the inner peripheral surface of the external circumferential wall portion 15. And, as shown in FIG. 4, during the locked state when fluid is charged into the fluid chamber for locking 21a and the piston member 22 is driven downward, the plurality of steel balls 16 are pushed to their maximum limit positions radially inward by the annular curved surface 22c of the rod portion 22b and partially project further radially inward than the inner peripheral surface of the external circumferential wall portion 15, so that they are engaged to the downwardly inclined sloping surface of the annular engagement portion 4c, and the robot arm coupling device 1 is put into the connected state.

Next, the two fluid pressure conduits 23, 24 that supply and disc charge fluid to and from the fluid pressure cylinder 20 will be explained. As shown in FIG. 3 and FIG. 4, a hollow hole 7 that is of larger diameter than the through hole 8 is formed in the central portion of the interior of the robot arm 2.

The first fluid pressure conduit 23 includes a conduit member 23a that is led through the hollow hole 7 and that is connected to a fluid pressure supply source, a conduit coupling 23b that is connected to the lower end of the conduit member 23a and that is screwed into and engaged with a screw hole in the annular member 11, and a small diameter passage 23c that is formed in the annular member 11 so as to connect the abovementioned screw hole to the fluid chamber for locking 21a.

And the second fluid pressure conduit 24 includes a conduit member 24a that is led through the hollow hole 7 and that is connected to the fluid pressure supply source, a conduit coupling 24b that is connected to the lower end of the conduit member 24a and that is screwed into and engaged with a screw hole in the annular member 11, and a small diameter passage 24c that is formed in the annular member 11 so as to connect the screw hole to the fluid chamber for unlocking 21b. Since the fluid pressure cylinder 20 is an annular fluid pressure cylinder, accordingly the first and second fluid pressure conduits 23, 24 can be disposed more radially inward in the master plate 3 than the plurality of steel balls 16 and the fluid pressure cylinder 20.

Next, two fluid pressure supply/discharge conduits 25 that have the same structure and that are capable of supplying fluid from the robot arm side to the tool side will be explained with reference to FIG. 1. The number of fluid pressure supply/discharge conduits 25 is not limited to being two; it would also be possible to provide only one fluid pressure supply/discharge conduit 25, or to provide three or more fluid pressure supply/venting conduits 25.

Each fluid pressure supply/discharge conduit 25 includes a conduit member 26 that is led through the hollow hole 7 in the robot arm 2 and is connected to the fluid pressure supply source, a conduit coupling 27 that is connected to the lower end of the conduit member 26, a first passage 28 that is formed within the master plate 3 and is connected to the conduit coupling 27, a second passage 30 that is formed within the tool plate 4, a coupling mechanism 29 that is interposed in the first passage 28 and is capable of connecting together the first and second passages 28, 30, a conduit member 32 that is led through the hollow hole 10 in the tool holding member 5, and a conduit coupling 31 that is connected to the upper end of the conduit member 32 and is also connected to the second passage 30.

Figure 5:
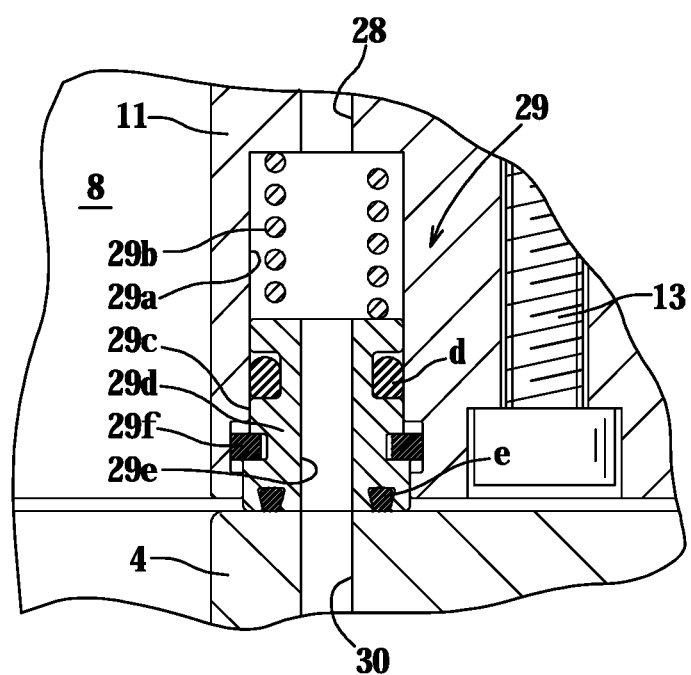
FIG. 5 is an enlarged sectional view of essential portions of a fluid supply/discharge conduit.

As shown in FIG. 5, the coupling mechanism 29 comprises a spring reception hole 29a, a compression spring 29b that is received in the spring reception hole 29a, a cylinder bore 29c that extends downward from the spring reception hole 29a, and a movable element 29d that is movably fitted in the cylinder bore 29c, that is biased downward by the compression spring 29b, and that includes a small diameter passage 29e at its center portion.

Seal members d, e are mounted on the outer periphery and the lower end portion of the upper portion of the movable element 29d. The movable element 29d is prevented from falling out from the cylinder bore 29c by a retaining ring 29f that is fitted on the outer peripheral portion of its intermediate portion. When the robot arm coupling device 1 is connected, the movable element 29d contacts against the upper surface of the tool plate 4, and the lower end of the first passage 28 is connected to the upper end of the second passage 30 in a fluid tight manner.

The operation and the beneficial effects of the robot arm coupling device 1 described above will now be explained.

Since the two fluid pressure conduits 23, 24 that supply/discharge fluid to/from the fluid pressure cylinder 20 are disposed more radially inward than the plurality of steel balls 16 and the fluid pressure cylinder 20, accordingly it is possible to arrange the fluid pressure conduits 23, 24 so that they do not project outside the outer periphery of the master plate 3.

Since the fluid pressure cylinder 20 is built as an annular fluid pressure cylinder, accordingly it can change over from the unlocking position to the locking position by shifting the plurality of steel balls 16 in the inward radial direction. Moreover, it is possible to ensure sufficient space for arranging the fluid pressure supply passages or conducting wires within the central space of the annular fluid pressure cylinder.

Since the two fluid pressure supply/discharge conduits 25 are disposed more radially inward than the plurality of steel balls 16 and the fluid pressure cylinder 20, accordingly it is possible to arrange the two fluid pressure supply/discharge conduits 25 so that they do not project outside the outer peripheries of the master plate 3 or of the tool plate 4.

Since the plurality of steel balls 16 are arranged in a ring in the annular gap 17, and the plurality of steel balls 16 are accommodated therein closely in the circumferential direction, accordingly the number of steel balls 16 can be increased; and, since the surface pressure at the contacting surfaces where the steel balls contact also becomes less, accordingly it is possible to accommodate the plurality of steel balls 16 closely together in the circumferential direction in the annular gap 17 that is defined between the opposing pair of annular taper surfaces 17a, 17b.

Moreover, it is possible to reduce the costs of production, because it is not necessary to form any housing groove for reducing the surface pressure at the contacting surface with the steel balls 16.

Since the fluid pressure cylinder 20 is an annular fluid pressure cylinder, accordingly it is possible to dispose the fluid pressure cylinder 20 near the outer periphery of the master plate 3, and it is possible to dispose the plurality of steel balls 16 near the outer periphery of the master plate 3.

Each of the fluid pressure supply/discharge conduits 25 includes the first passage 28 that is formed within the master plate 3, the second passage 30 that is formed within the tool plate 4, and the coupling mechanism 29 that is capable of connecting together the first and second passages 28, 30, so that, when connecting the robot arm coupling device 1, it is possible to connect the first and second passages 28, 30 together via the coupling mechanism 29.

Next, a robot arm coupling device 1A according to a variant embodiment will be explained.

Here, the same reference symbols are affixed to structural elements that are the same as in the embodiment described above, and only the structural elements that are different will be explained.

Figure 6:
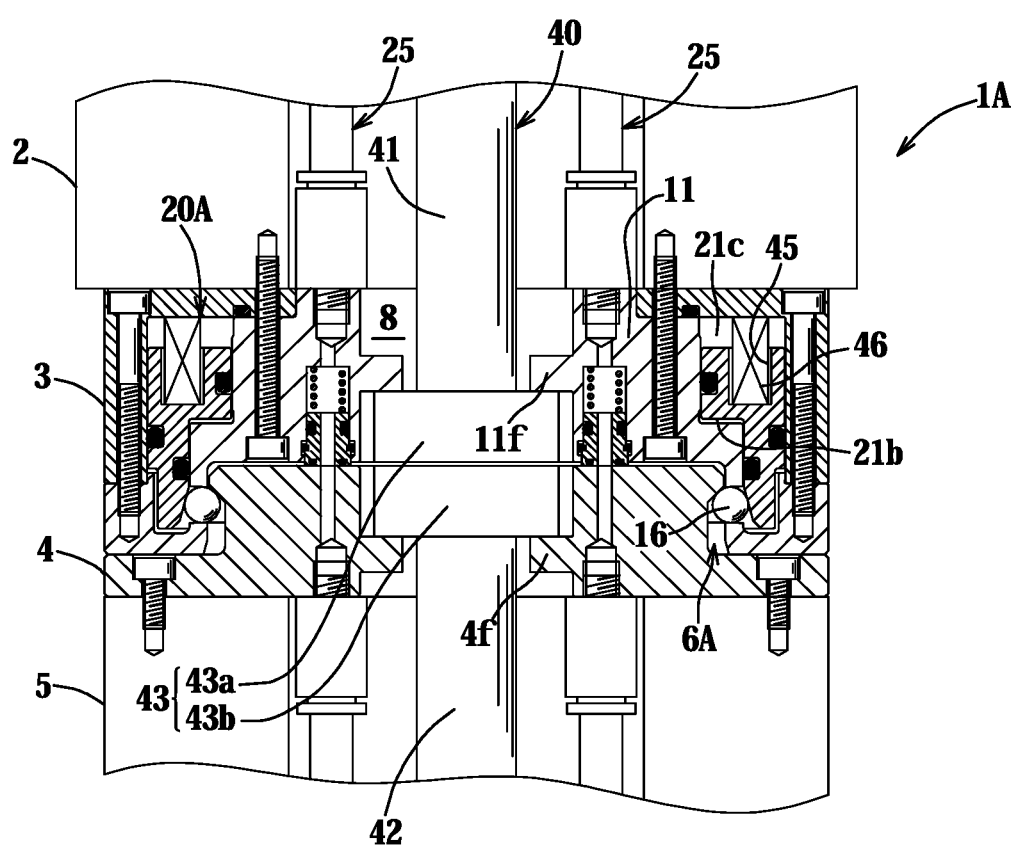
FIG. 6 is a vertically sectional view of a robot arm coupling device according to a second embodiment.

As shown in FIG. 6, a conducting wire bundle 40 in which are bundled together a plurality of conducting wires for transferring electrical power or electrical signals between the robot arm side and the tool side is disposed more radially inward than the plurality of steel balls 16 and the fluid pressure cylinder 20.

The conductive wire bundle 40 includes a first conducting wire bundle 41 that is disposed within the hollow hole 7 and the through hole 8 in the master plate 3, a second conducting wire bundle 42 that is disposed within the through hole 9 in the tool plate 4 and the hollow hole 10 in the tool holding member 5, and a connector 43 that connects together the first and second conducting wire bundles 41, 42 when the tool plate 4 is connected to the master plate 3 by the locking mechanism 6.

The connector 43 includes a male side connector 43a that is positioned by a flange portion 11f which projects into the through hole 8 of the annular member 11, and a female side connector 43b that is positioned by a flange portion 4f which projects into the through hole 9 of the tool plate 4. When the robot arm coupling device 1A is connected, the first and second coupling wire bundles 41, 42 can be connected together via the connector 43.

Furthermore, in this robot arm coupling device 1A, the fluid pressure cylinder 20 is altered. With this fluid pressure cylinder 20A, the fluid chamber for locking is omitted, and a chamber 21c vented to the atmosphere is provided. An annular groove 45 whose upper end opens to the chamber 21c vented to the atmosphere is formed in the piston portion 22a, and a compression spring 46 is installed in the annular groove 45, whereby the locking mechanism 6A can be held in its locked state by the elastic force of the compression spring 46. And the locking mechanism is changed over to its unlocked state by fluid being supplied to the fluid chamber for unlocking 21b.

The compression spring 46 mentioned above may consist of a single coil spring, or may be built up from a plurality of coil springs. Since the elastic force of the compression spring 46 maintains the locked state, accordingly the connected state of the robot arm coupling device 1A is preserved even if leakage of fluid occurs.

Examples in which the above embodiments are partially varied will be explained.

1) An air cylinder that is driven by pressurized air is preferred for the fluid pressure cylinder, but it would also be possible to employ a hydraulic cylinder that is driven by hydraulic pressure (i.e. by pressurized oil).

2) Instead of the external circumferential wall portion lower end portion 15b of the external circumferential wall portion 15, it would also be possible to form the external circumferential wall portion 15 integrally as a single member, to form a plurality of steel ball holding cavities consisting of taper holes oriented in the horizontal direction at appropriate intervals in the external circumferential wall portion 15, and to install the steel balls 16 movably in these steel ball holding cavities.

3) Instead of the steel balls 16, rollers or rotating cams or rotating claws may be employed.

4) Apart from the above, a person skilled in the art would be capable of adding various changes to the above embodiments, and the present invention is to be considered as including such modifications.

DESCRIPTION OF REFERENCE NUMERALS

1, 1A: robot arm coupling devices
2: robot arm
3: master plate
3a: concave engagement portion
4: tool plate
4a: convex engagement portion
4c: annular engagement portion
6, 6A: locking mechanisms
11a: end side split member
15: external circumferential wall portion
15a: external circumferential wall portion main body
15b: external circumferential wall portion lower end portion
16: steel balls (engagement members)
17: annular gap
17a, 17b: annular taper surfaces
20, 20A: fluid pressure cylinders
23, 24: fluid pressure passages
25: fluid pressure supply/venting conduit
28: first passage
29: coupling mechanism
30: second passage
40, 42: first and second conducting wire bundles
43: connector

The invention claimed is:

1. A robot arm coupling device comprising a master plate provided at a leading end portion of a robot arm, a tool plate that can be connected to the master plate and to which a tool is attached, and a locking mechanism that detachably connects the tool plate to the master plate, wherein:
the locking mechanism comprises:
a concave engagement portion that is formed on a lower side portion of the master plate so as to open downward;
a convex engagement portion that is formed on an upper side portion of the tool plate and is capable of being inserted into the concave engagement portion;
a plurality of engagement members that are installed at an external circumferential wall portion of the concave engagement portion, and are capable of being changed over between locking positions in which they engage with an engagement portion formed on the convex engagement portion, and unlocking positions in which they do not engage with the engagement portion; and
a fluid pressure cylinder that is formed in the master plate, and is capable of changing over the plurality of engagement members between unlocking positions and locking positions;
and wherein at least one fluid pressure passage that supplies and/or discharges fluid to and/or from the fluid pressure cylinder is provided in the master plate, each of the at least one fluid pressure passage being entirely more radially inward than the plurality of engagement members and the fluid pressure cylinder.

2. The robot arm coupling device according to claim 1, wherein the fluid pressure cylinder is an annular fluid pressure cylinder that changes over from the unlocking position to the locking position by shifting the plurality of engagement members in the inward radial direction.

3. The robot arm coupling device according to claim 1 or 2, wherein the at least one fluid pressure passage is configured to supply fluid from the robot arm side to the tool side.

4. The robot arm coupling device according to claim 3, wherein the fluid pressure supply/discharge conduit includes a first passage formed within the master plate, a second passage formed within the tool plate, and a coupling mechanism that is capable of connecting together the first and second passages.

5. The robot arm coupling device according to claim 1 or 2, wherein one or a plurality of conducting wires for transferring electrical power or electrical signals between the robot arm side and the tool side are disposed more radially inward than the plurality of engagement members and the fluid pressure cylinder.

6. The robot arm coupling device according to claim 5, wherein the conducting wire includes a connector that is electrically connected it together when the tool plate is connected to the master plate by the locking mechanism.

7. The robot arm coupling device according to claim 2, wherein the engagement members are steel balls;
an annular gap, capable of receiving the plurality of steel balls closely in a circumferential direction, is defined in the external circumferential wall portion of the concave engagement portion by a pair of annular taper surfaces that oppose one another; and the annular gap is defined by an external circumferential wall portion main body and an end side split member that is split from an end side portion of the external circumferential wall portion.

8. The robot arm coupling device according to claim 7, wherein
the fluid pressure cylinder is formed at a location near an outer periphery of the master plate; and the plurality of steel balls are disposed at a location near the outer periphery of the master plate.

9. A robot arm coupling device comprising a master plate provided at a leading end portion of a robot arm, a tool plate that can be connected to the master plate and to which a tool is attached, and a locking mechanism that detachably connects the tool plate to the master plate, wherein:
the locking mechanism comprises:
a concave engagement portion that is formed on a lower side portion of the master plate so as to open downward;

a convex engagement portion that is formed on an upper side portion of the tool plate and is capable of being inserted into the concave engagement portion;

a plurality of engagement members that are installed at an external circumferential wall portion of the concave engagement portion, and are capable of being changed over between locking positions in which they engage with an engagement portion formed on the convex engagement portion, and unlocking positions in which they do not engage with the engagement portion; and a fluid pressure cylinder that is formed in the master plate, and is capable of changing over the plurality of engagement members between unlocking positions and locking positions; and wherein at least one fluid pressure passage that supplies and/or discharges fluid to and/or from the fluid pressure cylinder is provided in the master plate more radially inward than the plurality of engagement members and the fluid pressure cylinder;

the engagement members are steel balls;

an annular gap, capable of receiving the plurality of steel balls closely in a circumferential direction, is defined in the external circumferential wall portion of the concave engagement portion by a pair of annular taper surfaces that oppose one another; and the annular gap is defined by an external circumferential wall portion main body and an end side split member that is split from an end side portion of the external circumferential wall portion.

10. The robot arm coupling device according to claim 9, wherein the fluid pressure cylinder is formed at a location near an outer periphery of the master plate; and the plurality of steel balls are disposed at a location near the outer periphery of the master plate.

* * * * *